United States Patent
Konig et al.

(10) Patent No.: US 11,416,457 B2
(45) Date of Patent: Aug. 16, 2022

(54) LOW CARDINALITY BIAS CORRECTION SYSTEM

(71) Applicant: Microsoft Technology Licensing, LLC, Redmond, WA (US)

(72) Inventors: Arnd Christian Konig, Kirkland, WA (US); Edgars Sedols, Redmond, WA (US); Parag Nandan Paul, Redmond, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 1205 days.

(21) Appl. No.: 15/860,474

(22) Filed: Jan. 2, 2018

(65) Prior Publication Data

US 2019/0205438 A1 Jul. 4, 2019

(51) Int. Cl.
*G06F 16/215* (2019.01)
*G06N 7/00* (2006.01)
*G06F 16/22* (2019.01)
*G06F 16/901* (2019.01)

(52) U.S. Cl.
CPC ........ *G06F 16/215* (2019.01); *G06F 16/2255* (2019.01); *G06F 16/9014* (2019.01); *G06N 7/005* (2013.01)

(58) Field of Classification Search
CPC . G06F 16/215; G06F 16/2255; G06F 16/9014
See application file for complete search history.

(56) References Cited

U.S. PATENT DOCUMENTS

| | | | |
|---|---|---|---|
| 9,128,697 B1* | 9/2015 | Potter | G06F 9/30014 |
| 2005/0065990 A1* | 3/2005 | Allen | G06F 9/45504 |
| | | | 708/495 |
| 2013/0254441 A1* | 9/2013 | Kipnis | H03M 7/3071 |
| | | | 710/68 |
| 2015/0269178 A1 | 9/2015 | Rhodes | |
| 2017/0300489 A1* | 10/2017 | Qin | G06F 16/2255 |

(Continued)

OTHER PUBLICATIONS

Flajolet, et al., "Hyperloglog: the analysis of a near-optimal cardinality estimation algorithm", In Proceedings of International Conference on Analysis of Algorithms, Jun. 17, 2007, pp. 127-146.

(Continued)

*Primary Examiner* — Richard L Bowen

(57) ABSTRACT

Bias correcting system for small number estimators. A computer system includes a distinct value estimator configured to estimate a number of distinct values in a data set. The computer system includes a bias table for the estimator. The bias table includes entries with values corresponding to biases caused by the distinct value estimator correlated to values corresponding to numbers estimated. The entries in the table are optimized by having a set of entries with an optimized number of biases in the entries. The biases in the entries are associated with predetermined confidence intervals. The system includes a bias corrector configured to correct the number of distinct values in the multiset data estimated by the distinct value estimator set using values from the bias table to produce a corrected value. The system includes a user interface coupled to the bias corrector configured to output the corrected value to a user.

20 Claims, 4 Drawing Sheets

(56) References Cited

U.S. PATENT DOCUMENTS

2017/0300528 A1* 10/2017 Qin .................... G06F 16/2453
2017/0300529 A1* 10/2017 Qin .................... G06F 16/2453
2018/0039956 A1*  2/2018 McElhinney .......... G06Q 10/20

OTHER PUBLICATIONS

Heule, et al., "Appendix to HyperLogLog in Practice: Algorithmic Engineering of a State of the Art Cardinality Estimation Algorithm", Retrieved From: <<https://docs.google.com/document/d/1gyjfMHy43U9OWBXxfaeG-3MjGzejW1dlpyMwEYAAWEI/view?fullscreen>>, Oct. 20, 2012, 19 Pages.

Heule, et al., "HyperLogLog in Practice : Algorithmic Engineering of a State of the Art Cardinality Estimation Algorithm", nProceedings of the 16th International Conference on Extending Database Technology, Mar. 18, 2013, 10 Pages.

Otmar Ertl, "New Cardinality Estimation Agorithms for Hyperloglog Sketches", In Journal of Computer Science, Feb. 4, 2017, 56 Pages.

"International Search Report and Written Opinion Issued in PCT Application No. PCT/US2018/067463", dated Mar. 21, 2019, 17 Pages.

"Office Action Issued in European Patent Application No. 18840127.7", dated Feb. 1, 2022, 9 Pages.

* cited by examiner

LOW CARDINALITY BIAS CORRECTION SYSTEM

BACKGROUND

Background and Relevant Art

Computers and computing systems have affected nearly every aspect of modern living. Computers are generally involved in work, recreation, healthcare, transportation, entertainment, household management, etc.

In computing systems, there is often a need to determine a number of distinct values in a set of elements. For example, consider a scenario where a database includes a number of different records. It is possible that many of the records are duplicates of one another. Thus, while a database may include 10,000 elements, it may be the case that only 2,000 of those elements are unique. The others are duplicates of one or more other elements. For example, a database may include a list of names and addresses where many of those names and addresses are duplicates of other names and addresses stored in the database. Thus, for example, even if a database has 10,000 instances of the value "Bob Smith", the database only has a single distinct value that is equal to "Bob Smith".

Some computing systems include a user interface that allows a user to request an identification of the number of distinct, unique values in a set of elements. If the computing system were required to evaluate each individual element, for determining the number of unique values, there are situations where such an operation would consume an inordinate amount of computing resources, which in turn drastically reduces the available computing resources for other operations. In particular, there are concerns with unbounded memory growth.

A multiset is a set that allows for duplicate values. Calculating the exact number of distinct values of a multiset requires an amount of memory proportional to the number of distinct values, which is impractical for very large data sets.

Thus, certain tools have been implemented to estimate the number of distinct values of a multiset. It is desirable that these tools be extremely accurate and efficient in terms of computing resources used. For example, probabilistic cardinality estimators, such as the HyperLogLog (HLL) estimator, use significantly less memory than calculating the exact number of distinct values of a multiset, at the cost of obtaining only an approximation of the number of distinct values. The HLL estimator is able to estimate distinct value sizes of >1029 with a typical accuracy of +/−2%, using 3 kB of memory in an implementation in SQL Server available from Microsoft Corporation of Redmond, Wash. HLL is an extension of the earlier LogLog algorithm, itself deriving from the 1984 Flajolet-Martin algorithm. Theoretically, the error should be 1.65% described as $1.04/\sqrt{m}$ where m=4096, for the particular example illustrated.

While an HLL estimator offers an unbiased estimator for sets with large numbers of distinct values, it is known that the estimate provided is highly biased towards over-estimates for multisets containing only small numbers of distinct values (i.e., having low cardinality). Generally, a small number of distinct values is about 20,000 when using an HLL estimator. Note that "small" or "low cardinality as used herein can vary somewhat depending on the particular HLL estimator used, but for the majority of HLL estimators, approximately 20,000 distinct values is where bias is significant, and grows as the number of distinct values decreases.

In general, the HLL estimator uses the number of leading zeros seen in the binary representation of a value, after applying a random hash function, for the value having the largest number of leading zeros in a multiset to approximate the number of distinct values in the multiset. Due to the random or quasi-random nature of the values in the multiset, when there are only a small number of distinct values, there is some probability that a value will occur with a large number of leading zeros resulting in the HLL estimator producing an estimation that is higher (and in some cases much higher) than the actual number of distinct values. Because leading zeros are used, HLL estimators are biased towards over estimation. In particular, when bits near the most significant bit are set, this results in an estimation of a large number of distinct values, where the large number can be significantly different than the actual number of distinct values. In contrast when only bits near the least significant bit are set, this estimates a low number of distinct values, which is in fact the case, i.e., there is a low number of distinct values. Thus, there is significantly more probability for overestimation than for underestimation, resulting in an overestimation bias.

This overestimation problem is known, and a number of approaches have been proposed to address it. Among them has been the use of different distinct value estimators (with higher overall variance) such as Linear Counting or exact distinct value counting for sets of small numbers of distinct values. The first approach requires maintaining multiple estimators in the code base. The second approach complicates query processing considerably, as the range of distinct values is typically not known up-front (only the total multiset size is), meaning either multiple passes over the data or redundant computation are required.

The subject matter claimed herein is not limited to embodiments that solve any disadvantages or that operate only in environments such as those described above. Rather, this background is only provided to illustrate one exemplary technology area where some embodiments described herein may be practiced.

BRIEF SUMMARY

One embodiment illustrated herein includes a computer system configured to correct bias when estimating small numbers of distinct values in a multiset data set. The computer system includes processors and memory coupled to the processors. The system includes a distinct value estimator configured to estimate a number of distinct values in a multiset data set. The computer system includes a bias table for the estimator. The bias table includes entries with values corresponding to biases caused by the distinct value estimator correlated to values corresponding to numbers estimated by the distinct value estimator. The entries in the table are optimized by having a set of entries with an optimized number of biases in the entries. The biases in the entries are associated with predetermined confidence intervals. The system includes a bias corrector configured to correct the number of distinct values in the multiset data estimated by the distinct value estimator set using values from the bias table to produce a corrected value. The system includes a user interface coupled to the bias corrector configured to output the corrected value to a user.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

Additional features and advantages will be set forth in the description which follows, and in part will be obvious from the description, or may be learned by the practice of the teachings herein. Features and advantages of the invention may be realized and obtained by means of the instruments and combinations particularly pointed out in the appended claims. Features of the present invention will become more fully apparent from the following description and appended claims, or may be learned by the practice of the invention as set forth hereinafter.

BRIEF DESCRIPTION OF THE DRAWINGS

In order to describe the manner in which the above-recited and other advantages and features can be obtained, a more particular description of the subject matter briefly described above will be rendered by reference to specific embodiments which are illustrated in the appended drawings. Understanding that these drawings depict only typical embodiments and are not therefore to be considered to be limiting in scope, embodiments will be described and explained with additional specificity and detail through the use of the accompanying drawings in which.

DETAILED DESCRIPTION

Figure 1:
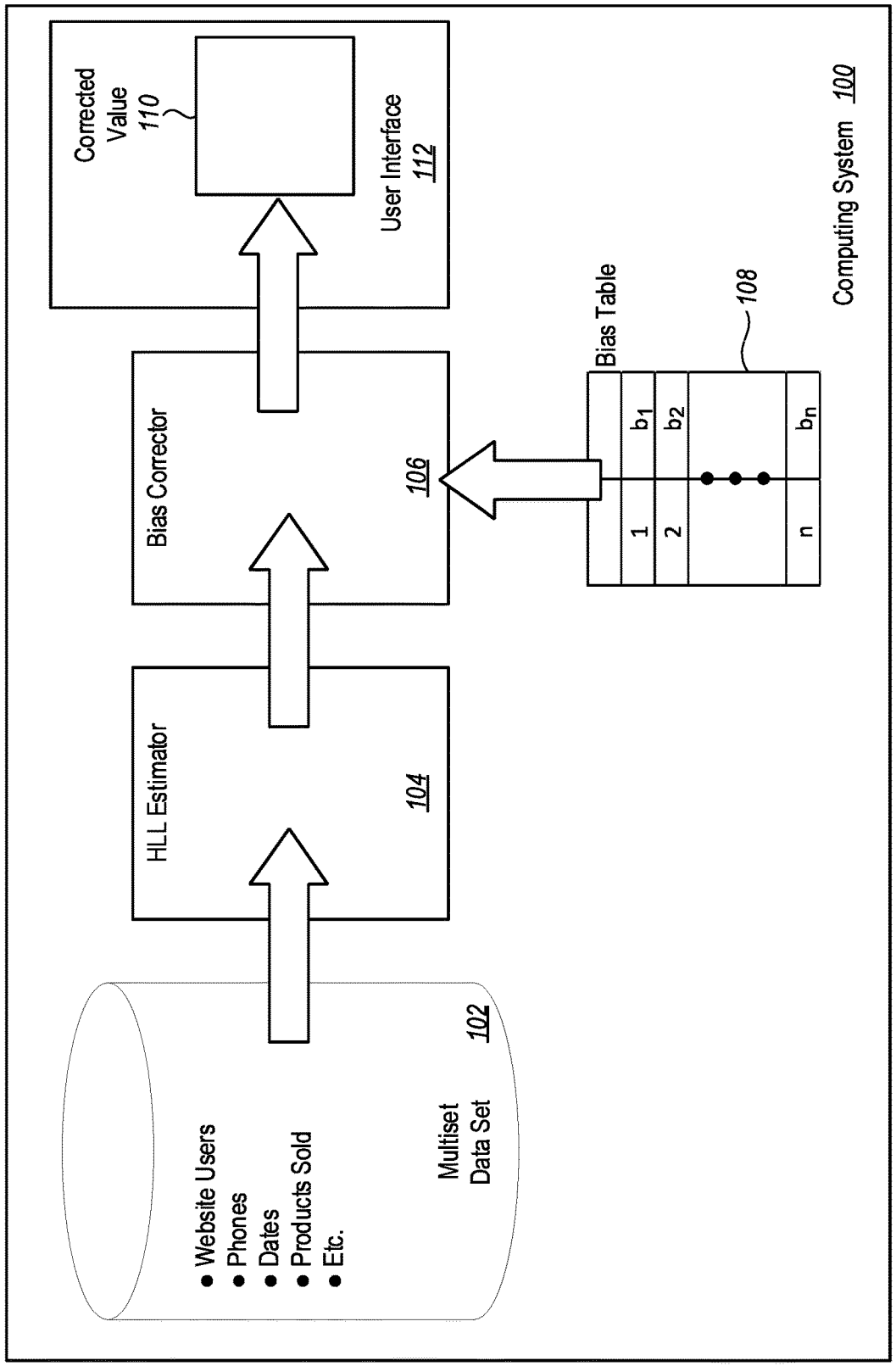
FIG. 1 illustrates a low cardinality bias correction system.

Embodiments illustrated herein are generally directed to correcting the bias when an HLL estimator, or other estimators that exhibit similar types of bias, is used on a set of values in a multiset that includes a "small" set of distinct values, where "small" is defined herein as approximately a number of distinct values that has a statistically significant (according to some predetermined criteria) overestimation bias for a given HLL estimator. In particular, embodiments may implement computing systems where the computing systems include an HLL estimator paired with a bias correction table. In particular, the bias of an HLL estimator for a given small number can actually be determined by conducting experiments. For example, if there is a desire to determine the bias when using a given HLL estimator when a set includes 50 distinct values, one or more multisets which include exactly 50 distinct randomly generated values can be produced. Note that each set includes a different set of 50 distinct values. Each of these sets can be evaluated by the particular HLL estimator, which produces an estimated number of distinct values. Note that applying a particular set of values to an HLL estimator is often referred to as creating a sketch. When a sufficient number of experiments have been performed (i.e., sketches created) for a given actual number of distinct values, statistical analysis can be used to determine the bias for a given number (in the present example, 50) of distinct values. Thus, in some embodiments, a table (or other data structure) can be created by running experiments with different sets having a known number of distinct values using a given HLL estimator to identify a bias offset for the given HLL estimator, for different numbers of distinct values.

Note that for some numbers of distinct values, it is quite expensive in terms of computing power to estimate the actual bias. Indeed, the number of experiments required to estimate the bias increases as the number of distinct values increases. Thus, some embodiments may create a table where the bias is determined for only certain numbers of distinct values. For other numbers of distinct values that have not been determined explicitly, various interpolation methods can be used using known biases to determine an approximation (or in many cases an exact determination) of the bias for a given number of distinct values. Typically it is desirable that linear interpolation be performed, as it is efficient in terms of use of computer resources to perform. With this constraint, some embodiments select the distinct values for which biases are stored in the table such that linear interpolation can be performed and still result in accurate determination of bias for distinct values not explicitly included in the table.

Indeed, in some embodiments, a computing system creation process, which includes a table creation process for creating tables to be installed on the computing system, may perform various minimization functions to limit the number of data points for which bias is determined. In particular, as will be illustrated in more detail below in conjunction with the description of FIG. 2, some determinations of bias magnitude for certain numbers of distinct values require more experiments to be performed than other determinations of bias magnitude for other numbers of distinct values. Additionally, for some numbers of distinct values the change in bias from one number of distinct values to the next, or even from one number of distinct values to another nearby number of distinct values, is sufficiently small that there is no need to determine the actual bias for all numbers of distinct values within a given range of numbers of distinct values. This can be seen by inspection of the rightmost portions of the graph shown in FIG. 2, where the bias magnitude changes little between numbers of distinct values produced by an HLL estimator.

Thus, some embodiments perform minimization functions when creating tables for installation on computing systems that minimize the number of experiments to be performed (by minimizing uncertainty as will be illustrated in more detail below) and minimizing the numbers of distinct values for which experiments are performed. This can be used to create an efficient table for installation on computing systems which include an HLL estimator matched to the table. Notably, different HLL estimators often include distinct parameters such that biases for a given exact number of distinct values will change from HLL estimator to HLL estimator. Thus, a given table is particular to a given HLL estimator. Different HLL estimators will need to use different tables. Additional details are now illustrated.

Referring now to FIG. 1, an example computing system 100 is illustrated. The example computing system 100 comprises various resources such as processors, memory, storage, network connections, and other computing hardware. In the example illustrated in FIG. 1, the computing system 100 includes a multiset data set 102. The multiset data set 102 includes a number of data items, where each data item has a value. For example, such data items may include names, addresses, users of a web site, specific telephone identifiers (e.g., a mobile identification number (MIN)), telephone numbers, dates, products sold by a web-site, voters in given region, countries, country codes, etc. It should be appreciated that in many cases different data items in the multiset data set 102 will have the same value. Thus, multiset data set 102 will include multiple data items, but among those multiple data items there will be a fewer number of distinct values represented in the multiset data set 102 than the number of items in the multiset data set 102.

Note that the computing system 100 may take a number of various different forms, and the multiset data set may be implemented in various different fashions. For example, in some embodiments, the multiset data set may be a data set in a database, such as SQL Server available from Microsoft Corporation of Redmond, Washington (or other database system). In this example, the multiset data set 102 is a stream of data from the database. In another example, the multiset data set may be streamed in network data.

As discussed above, the computing system 100 may include a user interface 112 with functionality that allows a user to request information about the number of distinct values included in the multiset data set 102. For example, in SQL Server, a user can invoke a command "SELECT COUNT (DISTINCT)" to identify the number of distinct values in a multiset data set. It may be difficult to physically count all of the distinct values in the multiset data set 102. Thus, some embodiments use an HLL estimator 104 to estimate the number of distinct values in the multiset data set 102. In many embodiments, the HLL estimator 104 is implemented in the main memory of the computing system 100. This allows for quick and efficient estimation of a number of distinct values.

In an alternative embodiment, the HLL estimator 104 may be implemented in specialized hardware specifically designed to perform the HLL estimator 104 functionality. For example, some embodiments may implement the HLL estimator 104 using hardware registers coupled to application specific integrated circuits configured to perform HLL estimations. This can be used to create a very fast HLL estimator.

As noted previously, when a small number of distinct values exist in the multiset data set 102, an over-estimation bias will occur. As discussed previously, small in this context can mean that an over-estimation bias of some significance occurs. In other embodiments, small may be defined as a preselected threshold value for which bias correction is performed when using an estimator such as an HLL estimator.

The multiset data set 102 is evaluated by the HLL estimator 104 to attempt to estimate the number of distinct values in the multiset data set 102. In some embodiments, if the HLL estimator 104 determines that the number of distinct values is sufficiently small, then the HLL estimator 104 will cause bias correction to be performed by a bias corrector 106. The bias corrector 106 receives as input an estimate of the number of distinct values from the HLL estimator 104 and information from a bias table 108 which correlates bias values to estimator values. The bias table 108 may actually take a number of different forms. For example, in some embodiments, corrected estimator values may be correlated to actual estimator values. For example, if the HLL estimator 104 produces a distinctive value estimation of 3,489.412, this may be correlated to a corrected value of 1050. In this case, the bias corrector 106 receives the estimated value of 3,489.412 from the HLL estimator 104, references the bias table 108, and produces a corrected value 110 of 1,050 in a user interface 112. As noted above, the user interface 112 may include elements that allow a user to request a distinct value count for a multiset data set. Thus, for example, the user interface 112 may be a user interface of a database system. Note that the 'user' as used herein does not necessarily require a human user. Rather, the user interface may be coupled to other components to receive input requesting a distinct value count and to output values for the count.

In an alternative embodiment, the bias table 108 may correlate estimated values with biases. Thus, using the same example above where the actual number of distinct values is 1,050 the bias table may correlate the estimator output of 3489.412 with the determined bias, which in this case is 2,439.412. In this example, the bias corrector 106 receives from the HLL estimator 104 an estimated number of distinct values of 3,489.412. The bias corrector 106 uses this as an index into the bias table 108. The bias corrector 106 can identify that the bias related to this estimate is 2,439.412. The bias corrector 106 can then subtract the bias from the HLL estimator 104 to obtain the corrected value of 1,050.

In an alternative embodiment, an actual number of distinct values may be correlated to biases in the bias table 108, which is further correlated to estimated values.

Note that in some embodiments, the HLL estimator 104 only invokes the bias corrector 106 when the estimate produced by the HLL estimator 104 is below some threshold value indicating that the number of distinct values is "small". Using a typical HLL estimator, small is about 20,000 distinct values.

Discussion is now directed to various processes used to create the bias table 108. The processes used can be understood in conjunction with the HLL bias graph 200 illustrated in FIG. 2. The HLL bias graph 200 graphs the magnitude of the bias produced by a particular HLL estimator against the number of distinct values input into the particular HLL estimator. The graph is created for a set of small numbers of distinct values. In this case, the set of small numbers of distinct values ranges from approximately 0 to approximately 22,000. Thus, a data set that includes a number of distinct values, in this particular example set the values are between $0\geq$ and $\leq 22,000$, would be included in the set of small numbers of distinct values. As can be seen by inspection of the HLL bias graph 200, bias decreases as the number of distinct values increases. Additionally, it should be noted that at the leftmost portion of the graph 200, bias decreases quickly as the number of distinct values increases for lower numbers of distinct values in the set of small numbers of distinct values. Additionally, as noted at the rightmost portion of the graph 200 there is little variation in bias as the number of distinct values increases for the larger numbers of distinct values.

The points on the graph 200 may be obtained by a statistical analysis. In particular, each point on the graph 200 is obtained by performing one or more experiments on an HLL estimator, such as the HLL estimator 104. The experiments include providing a multiset input to the HLL estimator, wherein the multiset input includes a known number of distinct values. The HLL estimator 104 will produce an estimated value. This estimated value can be compared to the known number of distinct values to determine the bias for a known number of distinct values evaluated by the HLL estimator 104.

It should be appreciated that typically a single experiment is not sufficient to identify accurate bias magnitude. Rather, multiple experiments may need to be performed for a given known number of distinct values to accurately obtain the magnitude of the bias for the known number of distinct values. Each of these experiments uses a different set of distinct values, but the same number of distinct values.

Additionally, it should be appreciated that different numbers of distinct values require different numbers of experiments to be performed to achieve obtaining bias magnitude that meets desired threshold confidence intervals.

In particular, as discussed above, inspection of the HLL bias graph 200 shows that there are steep ranges in the initial values of the bias steps. For example, the gradient is quite large between 600-1300 and it tapers off at the tail of the graph (e.g., between 15,000 to 20,000). This means that an interpolation may have to (linearly or otherwise) interpolate between two numbers that have significant gaps between them, which is a potential cause of correction errors as the curve shown in the HLL bias graph 200 does not follow a linear relationship.

Figure 3:
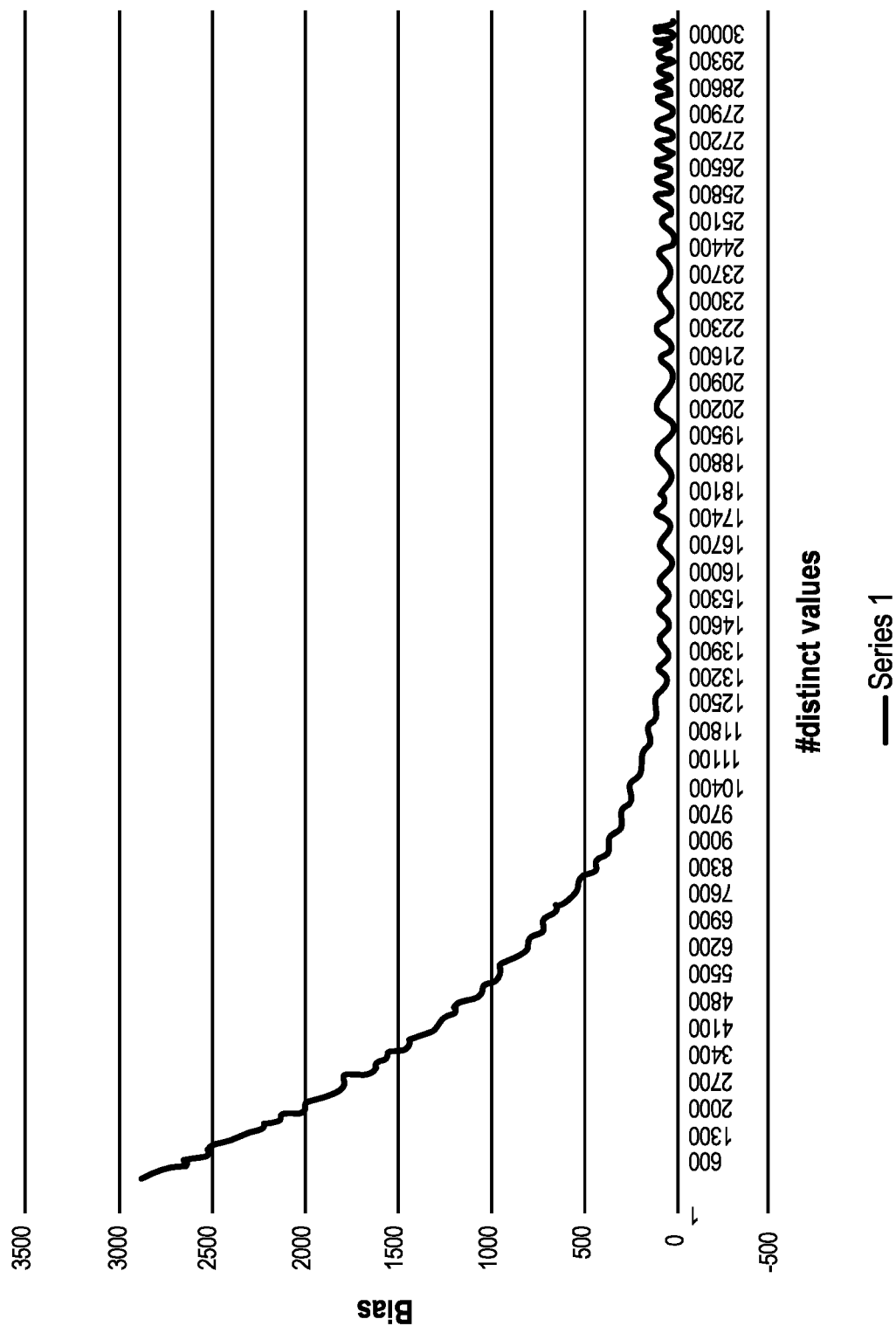
FIG. 3 illustrates a bias graph showing biases produced by a distinct value estimator when an insufficient number of sketches are created by the distinct value estimator to maximize confidence intervals of biases.

If the same number of experiments are run for the number of distinct values, the determined bias numbers themselves will have a "wavy" pattern for larger numbers of distinct values. For example, FIG. 3 illustrates an example where 5,000 experiments are performed for each number of distinct values. As can be observed, a wavy pattern becomes more pronounced above about 13,000 distinct values. This is indicative of the higher variance of the estimates of bias for larger sets. Therefore, to obtain more reliable (and smoother) bias values, additional experiments can be performed to obtain bias magnitude for certain numbers of distinct values.

Embodiments do not need to determine a bias magnitude for every number of distinct values. This is particularly true for higher numbers of distinct values as there is less variance in the bias from one number of distinct values to a next number of distinct values. However, at the lower end of the number of distinct values, experiments will need to be conducted for more of the numbers of distinct values as the bias magnitude changes quickly across different numbers of distinct values. Thus, for example, at the leftmost portion of the HLL bias graph 200, experiments may need to be performed for every number of distinct values, while at the rightmost portion of the HLL bias graph 200, it may be sufficient to run experiments for every 10th number (or some other number) of distinct values. Note that the actual delta can be determined using a statistical minimization that minimizes the magnitude of bias between numbers of distinct values. Thus, for example, so long as the magnitude of the bias is minimized according to some predetermined criteria, then a number of distinct values steps, i.e. a delta, can be used to determine a number of distinct values for which to perform experiments. In some embodiments, the following minimization may be performed to determine the delta value:

$$\min_{i}(b_i - b_{i+1}),$$

where $b_i$ is the magnitude of the bias for a particular bias and $b_{i+1}$ is the next adjacent bias value to be included in a bias table. Note that in some embodiments, this may result in a difference between bias values of around $1 \times 10^{-6}$. When choosing the various numbers of distinct values for which experiments are performed, embodiments estimate the corresponding bias and store these bias values in the bias table. Embodiments select the various numbers of distinct values such that the difference between two adjacent bias values is minimized. This ensures highly accurate bias values even when linear interpolation is performed.

Additionally, embodiments vary the number of experiments to achieve threshold confidence intervals in a bias magnitude. The number of experiments to be performed can be determined statistically by minimizing the size of the confidence intervals around the bias estimate. In particular, the following minimization of uncertainty can be performed to determine the number of experiments:

$$\min_{i} \frac{\text{Var}(b_i)}{\text{\# of Experiments}}.$$

Figure 2:
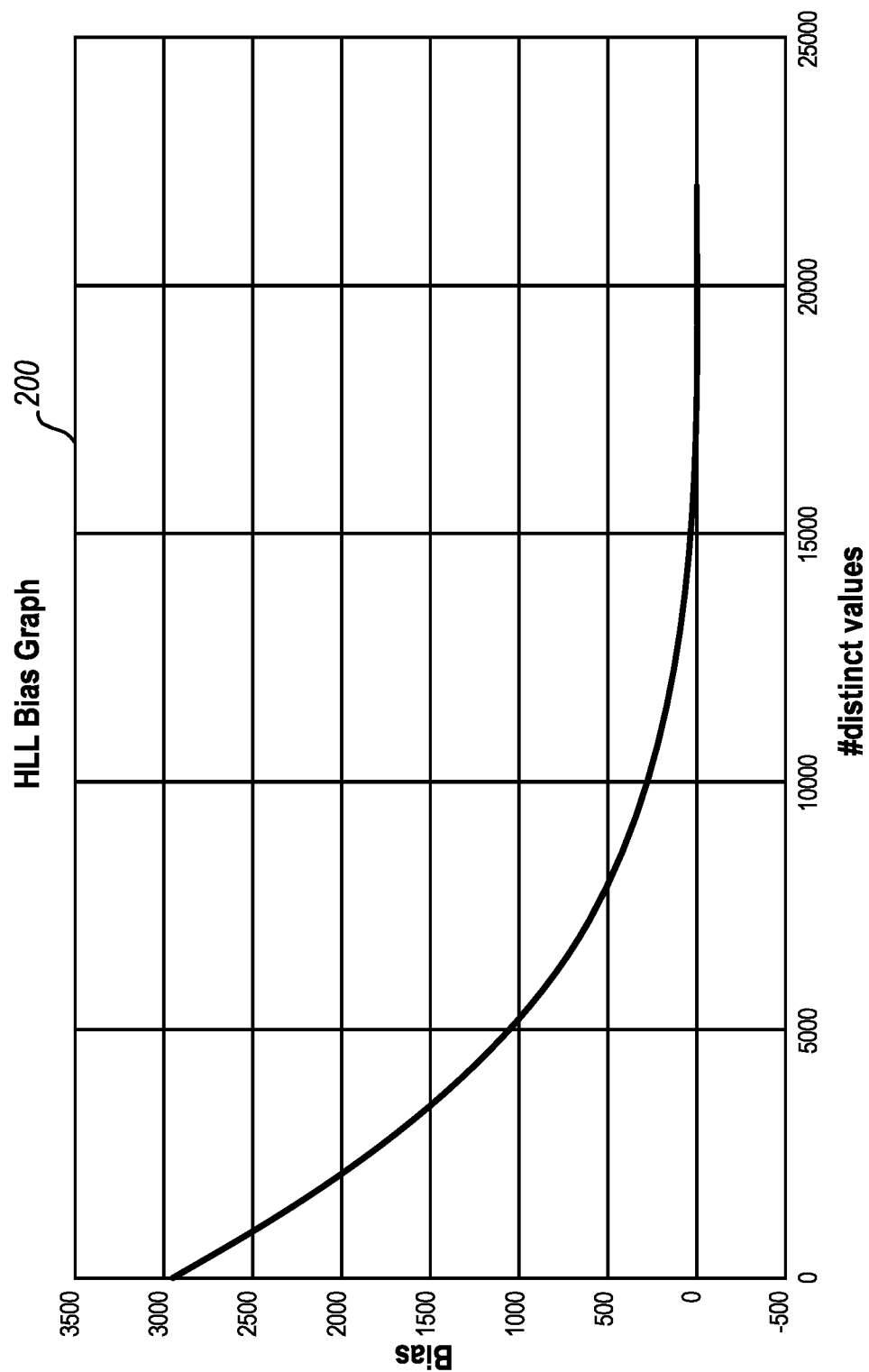
FIG. 2 illustrates a bias graph showing biases produced by a distinct value estimator.

As shown in FIG. 2 (and FIG. 3), more experiments will need to be performed for higher numbers of distinct values than for lower numbers of distinct values to obtain the same confidence interval levels of the magnitude of the bias.

Note that while minimization functions are illustrated here, other criteria could be used to select the delta values and the number of experiments. For example, various acceptable thresholds may be used that are not necessarily minimizations of the variance between bias values, and or minimization of uncertainty. In an alternative or additional embodiment, embodiments can select the magnitude of the delta and/or the number of experiments for a given value by assuming some probability distribution over queries (perhaps because something is known up-front about the application) and then picking these to minimize the expected error over this distribution.

Thus, returning once again to FIG. 1, embodiments can use functions which minimize bias error and functions which maximize bias magnitude confidence intervals (or minimize uncertainty) to create the bias table 108 (or use other methodologies as discussed above). These functions can be used to create a bias table 108 that is efficiently implemented in that the bias table does not need to include an entry for every number of distinct values in the set of small numbers of distinct values, and also includes highly accurate estimates of the magnitude of the bias for the numbers of distinct values in the set of small numbers of distinct values. This results in the bias corrector 106 being more accurate, and the computing system 100 being able to more accurately identify the number of distinct values in the multiset data set 102. Thus, an improved computing system 100 is implemented over previous systems which required expensive computing processes to be performed to account for biases caused by HLL estimators. Thus the computing system 100 is more efficient or includes capacity for performing more computing operations than previous computing systems by implementing the bias table 108 with the bias corrector 106.

Figure 4:
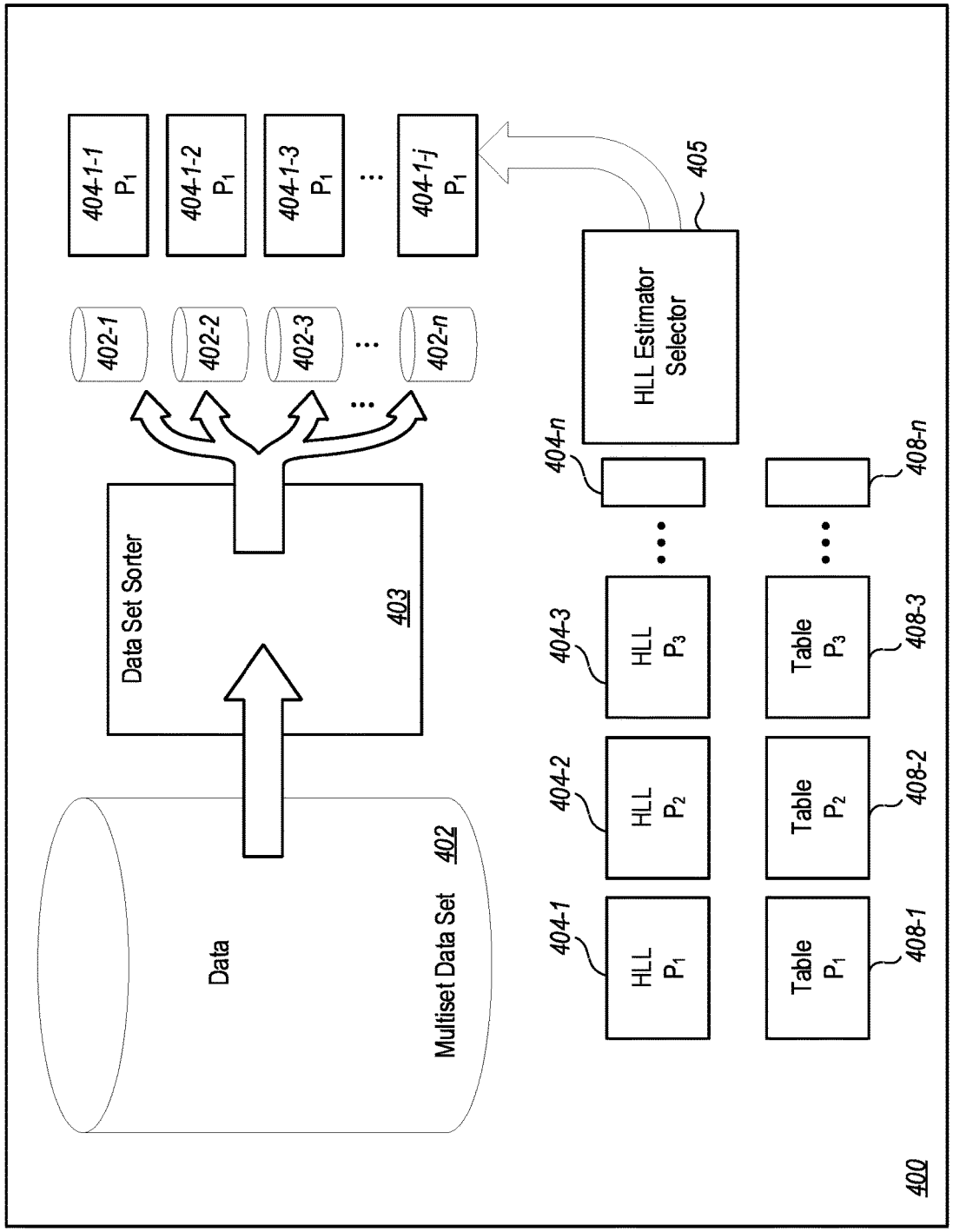
FIG. 4 illustrates a low cardinality bias correction system configured to implement multiple bias correctors.

Notably, it should be appreciated that various optimizations can be performed for implementing and/or using various different optimized computing systems. In particular, FIG. 4 illustrates another example of an alternative computing system 400. As will be illustrated by example herein, the computing systems are able to use a plurality of different HLL estimators and corresponding bias tables to accomplish certain desired functionality. In particular, it is often the case that a computing system, such as the computing system 400, will need to operate in parallel on a number of different multisets to estimate the number of distinct values in each of the multisets. However, a given computing system only has a limited amount of bandwidth. That is, a given computing system only has a limited amount of resources, for example memory resources, computing resources and/or network resources, that can be used to perform estimation functionality. It should also be noted that different HLL estimators require different amounts of computing resources to be implemented. For example, an HLL estimator that includes parameter elements that facilitate higher precision than another HLL estimator will require more computing resources such as computer memory, to be properly implemented. As an example, consider an HLL estimator implemented to operate by causing the following to be performed:

---

Let h : D → {0,1}$^{32}$ hash data from D to binary 32—bit words.
Let ρ(s) be the position of the leftmost 1—bit of s:
e.g., ρ(1 . . . ) = 1, ρ(0001 . . . )
  = 4, ρ(0$^K$) = K + 1.
define $\alpha_{16}$ = 0.673; $\alpha_{32}$ = 0.697; $\alpha_{64}$ = 0.709;

$$\alpha_m = \frac{0.7213}{1 + \frac{1.079}{m}} \text{ for } m \geq 128;$$

Program HyperLogLog (input M: multiset of items from domain D).
assume m = 2$^b$ with b ∈ [4..16].
initialize a collection of m registers, M[1], . . . , M[m], to 0;
for v ∈ M do
set x := h(v);
set j = 1 + (x$_1$ x$_2$ . . . x$_b$)$_2$;
{the binary address determined by the first b bits of x}
set w := x$_b$ + 1x$_b$ + 2 . . . ;
set M[j] := max(M[j], ρ(w));

$$\text{compute } E := \alpha_m m^2 \cdot \left( \sum_{j=1}^{m} 2^{-M[j]} \right)^{-1};$$

{the "raw" HyperLogLog estimate} if $E \leq \frac{5}{2} m$ then let V be the number of registers equal to 0;
if V ≠ 0 then set $$E^* := m \log\left(\frac{m}{V}\right) \text{else set } E^* := E; \{\text{small range correction}\}$$

if $E \leq \frac{1}{30} 2^{32}$ then set E* := E; {intermediate range—no correction} if $E > \frac{1}{30} 2^{32}$ then set E* := −2$^{32}$ log (1 − E/2$^{32}$);
returncardinality estimate E* with typical relative error ± 1.04 /√m.

$$\alpha_m m^2 \cdot \left( \sum_{j=1}^{m} 2^{-M[j]} \right)^{-1}$$

---

In this example, changing m changes the precision of the HLL estimator. In particular, the larger m is, the more precise the HLL estimator is. More precise HLL estimators require more computing resources.

Additionally, when multiple HLL estimators are used simultaneously, the required computing resources is directly proportional to the number of HLL estimators used simultaneously. Thus, HLL estimators may need to be selected for use dependent on the capabilities of the computing system 400 in view of the number of HLL estimators implemented simultaneously.

An example of this is illustrated in FIG. 4. FIG. 4 illustrates a multiset data set 402 which includes data that can be divided into a plurality of different multiset data sets.

For example, the multiset data set 402 may include a listing of all voters in a particular state. It may be desirable to sort the voters by county. It may be further desirable to estimate the number of distinct voters in each county. When the number of voters in a given county is "small" then it may be beneficial to use an HLL estimator along with a bias corrector to attempt to determine number of distinct voters in a given county. For example, FIG. 4 illustrates a data set sorter 403 that is configured to sort data from the multiset data set 402 into j different multiset data sets 402-1, 402-2, 402-3 . . . 402-j. It then may be desirable to estimate the number of distinct values in each of the multiset data sets 402-1, 402-2, 402-3 . . . 402-j. This can be done using HLL estimators. However, as noted previously, the computing system 400 has a limited amount of resources. Therefore, the HLL estimators need to be implemented in a way that allows the computing system 400 to run the HLL estimators without overburdening the computing system 400. The computing system 400 may have several different HLL estimator configurations (e.g., precisions) available to perform a number of distinct value estimations. These different estimator configurations may have different precision values, different hash functions, or other distinctions.

As illustrated in FIG. 4, an HLL estimator selector 405 is able to determine the number of multiset data sets that need to be estimated, the amount of resources needed to run particular HLL estimators on the computing system 400, and the computing bandwidth of the computing system 400. The HLL estimator selector 405 can then select an appropriate combination of HLL estimators to estimate the number of distinct values for the various multiset data sets 402-1, 402-2, 402-3 . . . 402-j in a fashion that does not overburden the computing system 400. In the example illustrated in FIG. 4, the HLL estimator selector 405 determines to instantiate four instances of the HLL estimator configuration 404-1 having a precision of P$_1$. Thus, FIG. 4 illustrates instances 404-1-1, 404-1-2, 404-1-3 . . . 404-1-j. Each of these instances of the HLL estimator configuration 404-1 will reference the corresponding table 408-1. Note that the computing system 400 includes a different corresponding table for each different HLL estimator configuration available on the computing system 400. In particular, in the example shown in FIG. 4, the HLL estimator configuration 404-1 corresponds to the table 408-1. The HLL estimator configuration 404-2, having a different precision P$_2$, uses the table 408-2 with bias offsets computed using the HLL estimator configuration 404-2. The HLL estimator configuration 404-3 having a precision P$_3$ uses the table 408-3, which was constructed using an HLL estimator with the HLL estimator configuration 404-3. FIG. 4 illustrates that a number n HLL estimators are implemented on the system.

The HLL estimator selector 405 can use various factors to determine which HLL estimators to instantiate on the computing system 100. For example, as noted above, the HLL estimator selector 405 may use the memory available on the computing system 400 in conjunction with the memory needed by different HLL estimators to select estimators.

Alternatively or additionally, the HLL estimator selector 405 may use information about the ability of a sketch (i.e., an HLL estimator evaluating a specific multiset) to be compressed to determine which HLL estimator to instantiate in the computing system 400. In particular, the HLL estimator selector 405 may determine when a given sketch will have a sparse distribution of set bits in registers allowing the sketch to be compressed. For example, empty registers can be compressed by storing a value indicating the next register that would have a value. For example, 10000000000001 could be compressed to 12 indicating how many zeros exist between set bits. By compressing sketches, more sketches can be implemented. Alternatively or additionally, by compressing sketches, higher precision HLL estimators (which produce larger sketches) can be implemented. The amount of compression can be used by the estimator selector to select the number of additional estimators and the configurations of the additional estimators that can be added to the computing system 400.

Additionally or alternatively, HLL estimator selector 405 may use networking hardware bandwidth, processor bandwidth, or other computing resource information about the computing system 400 to determine which HLL estimator(s) to instantiate on the computing system 400.

Note that while FIG. 4 illustrates a simple division problem for selecting each HLL estimator with the same configuration to instantiate multiple times for the different multiset data sets, it should be appreciated that in other embodiments the HLL estimator selector 405 may select a variety of different HLL estimator configurations to instantiate on the computing system 400. So long as the computing system 400 is able to efficiently run the different HLL estimators, there is no need for the instantiated HLL estimators to all be instantiations of the same HLL estimator.

Note that in some embodiments the HLL estimator selector 405 attempts to select HLL estimators that are able to be instantiated on the computing system 400 in view of the number of HLL estimators that need to be instantiated on the computing system 400 and the resources available at the computing system. Various selection algorithms may be implemented to perform various optimizations.

Further, the embodiments may be practiced by a computer system including one or more processors and computer-readable media such as computer memory. In particular, the computer memory may store computer-executable instructions that when executed by one or more processors cause various functions to be performed, such as the acts recited in the embodiments.

Embodiments of the present invention may comprise or utilize a special purpose or general-purpose computer including computer hardware, as discussed in greater detail below. Embodiments within the scope of the present invention also include physical and other computer-readable media for carrying or storing computer-executable instructions and/or data structures. Such computer-readable media can be any available media that can be accessed by a general purpose or special purpose computer system. Computer-readable media that store computer-executable instructions are physical storage media. Computer-readable media that carry computer-executable instructions are transmission media. Thus, by way of example, and not limitation, embodiments of the invention can comprise at least two distinctly different kinds of computer-readable media: physical computer-readable storage media and transmission computer-readable media.

Physical computer-readable storage media includes RAM, ROM, EEPROM, CD-ROM or other optical disk storage (such as CDs, DVDs, etc.), magnetic disk storage or other magnetic storage devices, or any other medium which can be used to store desired program code means in the form of computer-executable instructions or data structures and which can be accessed by a general purpose or special purpose computer.

A "network" is defined as one or more data links that enable the transport of electronic data between computer systems and/or modules and/or other electronic devices. When information is transferred or provided over a network or another communications connection (either hardwired, wireless, or a combination of hardwired or wireless) to a computer, the computer properly views the connection as a transmission medium. Transmissions media can include a network and/or data links which can be used to carry or desired program code means in the form of computer-executable instructions or data structures and which can be accessed by a general purpose or special purpose computer. Combinations of the above are also included within the scope of computer-readable media.

Further, upon reaching various computer system components, program code means in the form of computer-executable instructions or data structures can be transferred automatically from transmission computer-readable media to physical computer-readable storage media (or vice versa). For example, computer-executable instructions or data structures received over a network or data link can be buffered in RAM within a network interface module (e.g., a "NIC"), and then eventually transferred to computer system RAM and/or to less volatile computer-readable physical storage media at a computer system. Thus, computer-readable physical storage media can be included in computer system components that also (or even primarily) utilize transmission media.

Computer-executable instructions comprise, for example, instructions and data which cause a general purpose computer, special purpose computer, or special purpose processing device to perform a certain function or group of functions. The computer-executable instructions may be, for example, binaries, intermediate format instructions such as assembly language, or even source code. Although the subject matter has been described in language specific to structural features and/or methodological acts, it is to be understood that the subject matter defined in the appended claims is not necessarily limited to the described features or acts described above. Rather, the described features and acts are disclosed as example forms of implementing the claims.

Those skilled in the art will appreciate that the invention may be practiced in network computing environments with many types of computer system configurations, including, personal computers, desktop computers, laptop computers, message processors, hand-held devices, multi-processor systems, microprocessor-based or programmable consumer electronics, network PCs, minicomputers, mainframe computers, mobile telephones, PDAs, pagers, routers, switches, and the like. The invention may also be practiced in distributed system environments where local and remote computer systems, which are linked (either by hardwired data links, wireless data links, or by a combination of hardwired and wireless data links) through a network, both perform tasks. In a distributed system environment, program modules may be located in both local and remote memory storage devices.

Alternatively, or in addition, the functionality described herein can be performed, at least in part, by one or more hardware logic components. For example, and without limitation, illustrative types of hardware logic components that can be used include Field-programmable Gate Arrays (FPGAs), Program-specific Integrated Circuits (ASICs), Program-specific Standard Products (AS SPs), System-on-a-chip systems (SOCs), Complex Programmable Logic Devices (CPLDs), etc.

The present invention may be embodied in other specific forms without departing from its spirit or characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. A computer system configured to correct bias when estimating numbers of distinct values in a multiset data set, the computer system comprising:
   one or more processors;
   one or more computer readable media coupled to the one or more processors, wherein the one or more processors and one or more computer readable media are configured to implement:
      a distinct value estimator, wherein the distinct value estimator is configured to estimate a number of distinct values in a multiset data set;
      a bias table, corresponding to the distinct value estimator, the bias table having entries with values corresponding to biases caused by the distinct value estimator correlated to values corresponding to numbers estimated by the distinct value estimator, wherein the entries in the bias table are optimized by having a set of entries with an optimized number of biases in the entries and where the biases in the entries are associated with a predetermined confidence interval;
      a bias corrector coupled to the distinct value estimator and the bias table, wherein the bias corrector is configured to correct the number of distinct values in the multiset data set estimated by the distinct value estimator to produce a corrected value upon the number of distinct values in the multiset data set estimated by the distinct value estimator being below a threshold value, wherein the bias corrector identifies a bias corresponding to the estimated number of distinct values from the bias table and subtracts the identified bias from the estimated number of distinct values to produce the corrected value; and
      a user interface coupled to the bias corrector, wherein the user interface is configured to output the corrected value to a user.

2. The computer system of claim 1, wherein the user interface comprises a user interface of a database system.

3. The computer system of claim 1, further comprising:
   one or more additional distinct value estimators, wherein each of the one or more additional distinct value estimators is configured to estimate a number of distinct values in a different multiset data set; and
   one or more additional bias tables, each corresponding to one of the one or more additional distinct value estimators with values in the bias table derived from a specific configuration for the one of the one or more additional distinct value estimators.

4. The computer system of claim 3, wherein each of the one or more additional distinct value estimators have a same precision, such that distinct values are estimated with the same precision for each of different multiset data sets.

5. The computer system of claim 3, wherein the one or more additional distinct value estimators comprises a plurality of additional distinct value estimators, and wherein at least two of the plurality of additional distinct value estimators have different precisions.

6. The computer system of claim 5, wherein characteristics of the plurality of additional distinct value estimators are based on one or more of: (a) a number of multiset data sets for which estimations of a number of distinct values needs to be performed, (b) resources available at the computer system, and (c) an ability to compress one or more sketches created using one or more of the plurality of additional distinct value estimators.

7. The computer system of claim 1, wherein the one or more processors and one or more computer readable media are further configured to implement an estimator selector, the estimator selector selecting the distinct value estimator upon determining that a sketch has a sparse distribution of set bits in registers allowing the sketch to be compressed.

8. The computer system of claim 7, wherein the estimator selector selects a number of additional distinct value estimators, based on an amount of compression of sketches created using the additional distinct value estimators, for adding to the computer system.

9. The computer system of claim 1, wherein the distinct value estimator is a HyperLogLog (HLL) estimator.

10. The computer system of claim 1, wherein the set of entries with an optimized number of biases in the entries is optimized by having entries that result in a minimization of differences between adjacent biases in the entries.

11. The computer system of claim 1, wherein the predetermined confidence interval is a maximized confidence interval.

12. The computer system of claim 1, wherein the distinct value estimator is implemented in system memory of the computer system.

13. A method of making a computer system configured to correct bias when estimating numbers of distinct values in multiset data sets, the method comprising:
   implementing a distinct value estimator, wherein the distinct value estimator is configured to estimate a number of distinct values in a multi set data set;
   coupling a bias table to the distinct value estimator, wherein the bias table corresponds to the distinct value estimator, the bias table having entries with values corresponding to biases caused by the distinct value estimator correlated to values corresponding to numbers estimated by the distinct value estimator, wherein the entries in the bias table are optimized by having a set of entries with an optimized number of biases in the entries and where the biases in the entries are associated with a predetermined confidence interval;
   coupling a bias corrector to the distinct value estimator and the bias table, wherein the bias corrector is configured to correct the number of distinct values in the multiset data set to produce a corrected value upon the number of distinct values in the multiset data set estimated by the distinct value estimator being below a threshold value, wherein the bias corrector identifies a bias corresponding to the estimated number of distinct values from the bias table and subtracts the identified bias from the estimated number of distinct values; and
   coupling a user interface to the bias corrector, wherein the user interface is configured to output the corrected value to a user.

14. The method of claim 13, wherein coupling a user interface to the bias corrector comprises coupling a user interface of a database system to the bias corrector to allow a database to provide unbiased estimates of numbers of distinct values.

15. The method of claim 13, wherein implementing a distinct value estimator comprises implementing a HyperLogLog (HLL) estimator.

16. The method of claim 13, further comprising optimizing a number of biases in the entries by providing entries that result in a minimization of differences between adjacent biases in the entries.

17. The method of claim 13, further comprising performing a determined number of experiments using the distinct value estimator to maximize confidence intervals of the biases in the bias table.

18. The method of claim 13, wherein implementing a distinct value estimator comprises implementing the distinct value estimator in system memory of the computer system.

19. A method of outputting estimates of numbers of distinct values from a database system, the method comprising:
- implementing a sketch by applying a multiset data set to a distinct value estimator stored in memory of a computing system, wherein the distinct value estimator is configured to estimate a number of distinct values in the multiset data set;
- receiving an estimate of a number of distinct values in the multiset data set from the distinct value estimator;
- obtaining a bias corresponding to the estimate from a bias table, the bias table corresponding to the distinct value estimator, the bias table having entries with values corresponding to biases caused by the distinct value estimator correlated to values corresponding to numbers estimated by the distinct value estimator, wherein the entries in the bias table are optimized by having a set of entries with an optimized number of biases in the entries and where the biases in the entries are associated with predetermined confidence intervals;
- correcting the estimate of the number of distinct values using the bias corresponding to the estimate from the bias table upon the number of distinct values in the multiset data set estimated by the distinct value estimator being below a threshold value, wherein correcting comprises subtracting the bias from the estimated number of distinct values; and
- outputting the corrected estimate at a user interface of the database system.

20. The method of claim 19, further comprising receiving user input at the user interface requesting a distinct value count, and wherein the method is performed in response to receiving the user input.

* * * * *